United States Patent [19]
Terasawa et al.

[11] Patent Number: 5,732,178
[45] Date of Patent: Mar. 24, 1998

[54] SINGLE-MODE OPTICAL FIBER

[75] Inventors: Yoshiaki Terasawa; Shinji Ishikawa; Takatoshi Kato, all of Yokohama, Japan

[73] Assignee: Sumitomo Electric Industries, Ltd., Osaka, Japan

[21] Appl. No.: 756,484

[22] Filed: Nov. 26, 1996

[30] Foreign Application Priority Data

Nov. 28, 1995 [JP] Japan .................... 7-309033
Nov. 14, 1996 [JP] Japan .................... 6-303103

[51] Int. Cl.$^6$ .................................................. G02B 6/02
[52] U.S. Cl. .................. 385/127; 385/123; 385/126; 385/141; 385/142; 385/144
[58] Field of Search ....................... 385/123, 126, 385/127, 128, 141, 142, 144

[56] References Cited

U.S. PATENT DOCUMENTS

| | | | |
|---|---|---|---|
| 4,755,022 | 7/1988 | Ohashi et al. | 385/123 X |
| 4,822,399 | 4/1989 | Kanamori et al. | 65/3.12 |
| 4,877,304 | 10/1989 | Bhagavatula | 385/123 X |
| 5,363,463 | 11/1994 | Kleinerman | 385/123 |
| 5,553,185 | 9/1996 | Antos et al. | 385/127 |
| 5,555,340 | 9/1996 | Onishi et al. | 385/127 |
| 5,581,647 | 12/1996 | Onishi et al. | 385/123 |
| 5,613,027 | 3/1997 | Bhagavatula | 385/123 |
| 5,649,044 | 7/1997 | Bhagavatula | 385/123 X |

FOREIGN PATENT DOCUMENTS

| | | | |
|---|---|---|---|
| 63-217311 | 9/1988 | Japan | 385/123 X |
| 3-18161 | 3/1991 | Japan | 385/123 X |

OTHER PUBLICATIONS

Dispersion GeO2-SiO2 Glasses, James W. Fleming. Applied Optics/vol. 23, No. 24/15 Dec. 1984, pp. 4486–4493.

Refractive Index Dispersion and Related Properties in Fluorine Doped Silica. J.W. Fleming et al. Applied Optics/vol. 22, No. 19/1 Oct. 1983, pp. 3102–3104.

Estimation of Nonlinear Refractive Index in Various Silica–Based Glasses for Optical Fibers. T. Kato et al. 1995 Optical Society of America, pp. 2279–2281.

Electronics Letters 22nd May 1986 vol. 22 No. 11, pp. 574 & 575.

Generic Requirements GR–20–Core Issue 1, Sep. 1994 Generic Requirements for Optical Fiber and Fiber Optic Cable pp. 4–1–4–14.

*Primary Examiner*—Brian Healy
*Attorney, Agent, or Firm*—Cushman Darby & Cushman IP Group of Pillsbury Madison & Sutro LLP

[57] ABSTRACT

This invention relates to a dispersion-shifted fiber containing silica glass as the major component and in which the zero-dispersion wavelength is set to fall within a range of 1,560 nm to 1,580 nm and the mode field diameter with respect to light having a predetermined wavelength is set to 8 μor more. This dispersion-shifted fiber is a single-mode optical fiber capable of decreasing the influence of nonlinear optical effect and having a structure for suppressing an increase in bending loss of the optical fiber, and includes a core region constituted by the first core portion and the second core portion, and a cladding portion. In particular, an outer diameter a of the first core portion and an outer diameter b of the second core portion satisfy at least a relationship $0.10 \leq a/b \leq 0.29$.

15 Claims, 6 Drawing Sheets

SINGLE-MODE OPTICAL FIBER

BACKGROUND OF THE INVENTION

1. Field of the Invention

The present invention relates to a silica-based single-mode optical fiber applied to the transmission line of optical communications and, more particularly, to a dispersion-shifted fiber in which the zero-dispersion wavelength is set within a range of 1,560 nm to 1,580 nm.

2. Related Background Art

Conventionally, in an optical communication system to which a single-mode optical fiber (to be referred to as an SM optical fiber hereinafter) is applied as a transmission line, light having a wavelength band of 1.3 µm or a 1.55 µm is often utilized as communication signal light. Recently, use of light having a wavelength band of 1.55 µm increases from the viewpoint of reduction in transmission loss of the transmission line. In particular, as the transmission loss of a silica-based SM optical fiber is minimum for light having a wavelength band of 1.55 µm, the wavelength dispersion (a phenomenon in which the pulse wave spreads because the light propagation speed changes depending on wavelengths) of an SM optical fiber applied to the transmission line of light having a wavelength band of 1.55 µm (to be referred to as a 1.55-µm SM optical fiber hereinafter) is also designed to be zero for light having a wavelength band of 1.55 µm. A 1.55-µm SM optical fiber in which the zero-dispersion wavelength is shifted to the 1.55-µm wavelength band in this manner is generally called a dispersion-shifted fiber.

It is known that such a dispersion-shifted fiber can be obtained by making its refractive index profile to the dual shape type as disclosed in, e.g., Japanese Patent Publication No. 3-18161 (1991), or the segmented core type as disclosed in "Relation between Macrobending Losses and Cutoff Wavelength in Dispersion-Shifted Segmented-Core Fiber" by A. O. BJARKLEV (Electronics Letter, Vol. 22, No. 11, pp. 574–575, Apr. 8, 1986). A dispersion-shifted fiber having such a refractive index profile can be obtained by forming its cladding region substantially with pure silica glass and its core region with silica glass doped with germanium to increase its refractive index.

Japanese Patent Laid-Open No. 63-21733 (1988) discloses a dispersion-shifted fiber comprising a core region constituted by an inner core and an outer core and a cladding region formed on the outer surface of the core region. In particular, in this dispersion-shifted fiber, fluorine is added to the respective glass regions of the outer core and the cladding to decrease their refractive indices with respect to pure silica glass, and the amount of germanium added to the inner-layer core is decreased, thereby decreasing the transmission loss resulting from Rayleigh scattering without changing the entire refractive index profile.

SUMMARY OF THE INVENTION

In recent years, a technology for long-distance transmission in which a light beam is subjected to wavelength division multiplex is made possible due to the advent of an optical amplifier. A waveform distortion of signal light pulse caused by the nonlinear optical effect, e.g., four-lightwave mixing, seriously limits the transmission distance and the transmission speed.

It is known that the nonlinear optical effect which causes a distortion in signal light pulse increases in proportion to the optical power density of the signal light (the density of the signal light intensity at a predetermined portion of the SM optical fiber) and the nonlinear refractive index of the optical fiber serving as the optical transmission medium. Therefore, in the optical transmission system to which an optical amplifier is applied, a waveform distortion of signal light pulse caused by the nonlinear optical effect, which did not cause a problem in practice in a conventional optical transmission system to which an optical amplifier is not applied, has not been neglected due to an increase in signal light intensity.

A refractive index $<N>$ of a medium under intensive light changes depending on the light intensity, as described above. Accordingly, the minimum-order effect for the refractive index $<N>$ can be expressed by:

$$<N> = <N_0> + <N_2> \cdot E^2$$

where $<N_0>$: refractive index for linear polarization $<N_2>$: second-order nonlinear refractive index for third-order nonlinear polarization E: amplitude of photoelectric field More specifically, under intensive light, the refractive index $<N>$ of the medium is given by the sum of the ordinary value $<N_0>$ and an increase which is proportional to the second power of the photoelectric field amplitude E. In particular, the proportional constant $<N_2>$ ($m^2/V^3$) of the second term is called the second-order nonlinear refractive index. A waveform distortion in signal light pulse is mainly influenced by the second-order nonlinear refractive index of nonlinear refractive indices. Thus, in this specification, a nonlinear refractive index mainly means this second-order nonlinear refractive index.

A decrease of signal light intensity is not preferable from the viewpoint of improving the transmission characteristics (particularly the transmission distance). Thus, in order to suppress the nonlinear optical effect described above, it is preferable that the nonlinear refractive index be decreased or the mode field diameter (to be referred to as the MFD hereinafter) for signal light having a predetermined wavelength be increased, so that the optical power density be decreased without decreasing the signal light intensity as a whole.

In general, however, when the MFD is increased, the bending transmission loss (an increase in transmission loss obtained upon bending an optical fiber; to be referred to as a bending loss hereinafter) is increased. Thus, a decrease of distortion of the signal light pulse accompanying the non-linear optical effect only by increasing the MFD is limited.

In the conventional dispersion-shifted fiber, since germanium is added to the core region where the signal light has a high optical power density, the nonlinear refractive index increases in accordance with the concentration of germanium, inevitably increasing the influence of the non-linear optical effect. If, however, the concentration of germanium in the core region is merely decreased, although the nonlinear refractive index of the core region is decreased, the relative refractive index difference between the core region and the cladding region is also decreased, so a desired zero-dispersion wavelength cannot be obtained. More particularly, in an SM optical fiber in which the MFD is set to 8 µm (8,000 nm) for signal light having a predetermined wavelength (e.g., 1.55-µm wavelength band), its zero-dispersion wavelength becomes 1,560 nm or less, or its bending loss is undesirably increased.

The dependency of the nonlinear refractive index on the fiber composition (the relationship between the dose of an impurity and the nonlinear refractive index) is described in detail in, e.g., "Estimation of nonlinear refractive index in various silica-based glasses for optical fibers" by T. Kato et al. (OPTICS LETTERS, Vol. 20, No. 22, pp. 2,279–2,281, Nov. 15, 1995).

It is an object of the present invention to provide a single-mode optical fiber having a structure for decreasing the influence of the nonlinear optical effect and suppressing an increase in bending loss while ensuring a sufficiently large MFD.

In order to achieve the above object, there is provided an SM optical fiber which is a dispersion-shifted fiber containing silica glass as a major component such that a zero-dispersion wavelength is set to fall within a range of 1,560 nm and 1,580 mm and an MFD for light having a predetermined wavelength is set to not less than 8μm. Such an SM optical fiber is directed to the transmission line of optical communications mainly in the 1.55-μm wavelength band. In multiplex communications, however, more signal light pulses having the same wavelength pass through this fiber. Thus, near the center of the core region having a high optical power density, the influence of the nonlinear optical effect tends to appear more easily. Hence, in the dispersion-shifted fiber according to the present invention, the zero-dispersion wavelength is slightly shifted from the signal light wavelength band in order to intentionally generate wavelength dispersion, thereby suppressing the influence of the nonlinear optical effect.

Furthermore, an SM optical fiber according to the present invention comprises a first core portion in which an average relative refractive index difference with respect to pure silica glass is set to a first value $\Delta n_a$, a second core portion which is formed on an outer surface of the first core portion and in which an average relative refractive index difference with respect to pure silica glass is set to a second value $\Delta n_b$ smaller than the first value $\Delta n_a$, and a cladding portion which is formed on an outer surface of the second core portion and in which an average relative refractive index difference with respect to pure silicia glass is set to a negative third value $\Delta n_c$ smaller than the second value $\Delta n_b$.

In particular, the first and second core portions satisfy the following relationship:

$$0.10 \leq a/b \leq 0.29$$

where a is the outer diameter of the first core portion and b (>a) is the outer diameter of the second core portion.

The first core portion is substantially made of either one of pure silica glass and silica glass doped with only germanium as a dopant. The second core portion is substantially made of either one of pure silica glass, silica glass doped with at least fluorine as a dopant, and silica glass doped with at least germanium as a dopant. The cladding portion is substantially made of silica glass substantially doped with only fluorine as a dopant. Therefore, the dispersion-shifted optical fiber according to the present invention includes at least (1) the first aspect constituted by a first core portion substantially made of pure silica glass, a second core portion made of silica glass containing fluorine, and a cladding portion made of silica glass containing fluorine; (2) the second aspect constituted by a first core portion made of silica glass containing germanium, a second core portion substantially made of pure silica glass, and a cladding portion made of silica glass containing fluorine; (3) the third aspect constituted by a first core portion made of silica glass containing germanium, a second core portion made of silica glass containing germanium, and a cladding portion made of silica glass containing fluorine; and (4) the fourth aspect constituted by a first core portion made of silica glass containing germanium, a second core portion made of silica glass containing fluorine, and a cladding portion made of silica glass containing fluorine. In particular, since mixing of both germanium and fluorine in the same glass region is avoided, an unnecessary increase in nonlinear refractive index can be prevented.

As described above, in the SM optical fiber according to the present invention, the relative refractive index difference of the cladding portion, which has a small signal light intensity or through which the signal light substantially does not propagate, with respect to pure silica glass is set to a negative value. Hence, the concentration of the dopant, e.g., germanium, to be added to the first core portion where the signal light has a high optical power density, in order to increase the refractive index can be decreased while maintaining the refractive index difference among the first and second core portions and the cladding portion. As a result, the nonlinear refractive index for signal light of the dispersion-shifted fiber as a whole is decreased, so that occurrence of the nonlinear optical effect during transmission of this signal light can be suppressed, thereby decreasing a waveform distortion of signal light pulse.

The nonlinear refractive index of an optical fiber for signal light, when observing a section perpendicular to the traveling direction of the signal light, is determined by the values of the nonlinear refractive index at the respective portions of the optical fiber and the light intensities of the respective portions of the optical fiber. This nonlinear refractive index increases with an increase in concentration of germanium or fluorine added to the silica glass, as described above. In general, the refractive index profile of a dispersion-shifted fiber is not uniform in the radial direction even in a fiber having an axially symmetric refractive index profile, and accordingly the concentration of the dopant such as germanium or fluorine changes in the radial direction. These facts must be taken into consideration.

For example, in a dispersion-shifted fiber having an axially symmetric structure, when light having a light intensity distribution I(r) travels through this dispersion-shifted fiber, the second-order nonlinear refractive index $<N_2>$ of the dispersion-shifted fiber as a whole is given by:

$$<N_2> = \frac{\int_0^\infty N_2(r) \cdot I_{(r)}^2 \cdot r \cdot dr}{\int_0^\infty I_{(r)}^2 \cdot r \cdot dr}$$

where $N_2(r)$: second-order nonlinear refractive index at position r in radial direction r: position in radial direction The third-order nonlinear refractive index or those of third or higher orders can be obtained in the same manner.

As indicated in this equation (1), in order to decrease the influence of the nonlinear optical effect in a dispersion-shifted fiber, the nonlinear refractive index at a portion having a high light intensity I(r) may be decreased. Specifically, the concentration of germanium or fluorine at a portion having a high light intensity I(r) may be decreased. More specifically, the concentration of germanium or fluorine at a core region of this dispersion-shifted fiber which has a high signal light intensity may be decreased.

In the SM optical shift fiber according to the present invention, the core region is constituted by the first and second core portions. Accordingly, if predetermined MFD and zero-dispersion wavelength are selected, a decrease in the first value $\Delta n_a$ tends to cause an increase in bending loss. The inventors have confirmed that, in a dispersion-shifted fiber which has a first core portion and a second core portion as the core region and the zero-dispersion wavelength set within the range of 1,560 to 1,580 nm, when the first value $\Delta n_a$ is decreased and the MFD is set to 8 µ or more, the bending loss is increased.

It is known that the bending loss of an optical fiber depends on a value obtained by dividing the MFD by a cutoff wavelength (to be referred to as a MAC value hereinafter). The smaller the MAC value, the smaller the bending loss. In general, when a value obtained by dividing an outer diameter a of the first core portion by an outer diameter b of the second core portion (to be simply referred to as a/b hereinafter) is decreased, the cutoff wavelength is increased, so that the MAC value is decreased. This is advantageous in terms of decreasing the bending loss.

Both the improvement of bending loss by means of decreasing a/b and the decrease in nonlinear refractive index by means of suppressing the doses of the dopants in the respective glass regions can be achieved. More specifically, the present inventors have confirmed that, according to the requirements (the bending loss at a diameter of 32 mm (to be referred to as a 32-mmφ bending loss hereinafter) should be 0.50 dB/turn or less for light having a wavelength of 1,550 nm) indicated by the standard 4.2.6 Fiber Macrobend (Generic Requirements for Optical Fiber and Fiber Optic Cable, GR-20-CORE ISSUE 1, SEPTEMBER 1994) announced by Bellcore Inc., U.S.A., $0.10 \leq a/b \leq 0.29$ becomes the optimum range. The outer diameter a of the first core portion obtained at this time is substantially 1 to 6 µm ($1 \mu m \leq a \leq 6 \mu m$).

In the above optimum range, the lower limit of a/b is 0.10. When a/b becomes less than this lower limit, even when the relative refractive index differences among the first core, the second core, and the cladding stay the same values as in the conventional case, the cutoff wavelength becomes shorter than a signal light wavelength (=1,558.5 nm) which is normally employed when an optical amplifier is used. Then, in propagation of such signal light, the single-mode conditions cannot be maintained. In the above optimum range, the upper limit of a/b is 0.29. Even if the MFD is 8 µm or more, the bending loss can be lower than that in the conventional dispersion-shifted fiber.

The bending loss of an optical fiber largely changes depending on the structures of the cables. Thus, the standard required for a structure in which an optical fiber is firmly coated with a resin, which is mainly adopted in Japan or the like, is generally ten or more times stricter than the Bellcore standard (that is, the allowable bending loss is about 1/10) described above. Hence, in order to satisfy the requirements that the 32-mm diameter bending loss (32-mmφ bending loss) should be 0.50 dB/turn or less for light having a wavelength of 1,550 nm, $0.10 \leq a/b \leq 0.25$ becomes the optimum range. The outer diameter a of the first core portion obtained at this time is substantially 1 to 5 µm ($1 \mu m \leq a \leq 5 \mu m$). For the reference, the 0.05 dB/turn of the 32-mmφ bending loss substantially equals to 0.5 dB/m of the 32-mmφ bending loss, and further substantially equals to 1 dB/m of a 30-mm diameter bending loss (30-mmφ bending loss).

The SM optical fiber according to the present invention is characterized in that, in the SM optical fiber having the above structure, the second value $\Delta n_b$ is 0% or less. Since the second value $\Delta n_b$ is set to 0% or less in this manner, the concentration of germanium added to the first core portion can be decreased (including a case wherein germanium is not added), and the nonlinear refractive index of the first core portion can be decreased. In particular, this arrangement is suitable for a case wherein the degree of concentration of the transmission light in the first core portion is large.

The SM optical fiber according to the present invention is characterized in that, in the SM optical fiber having the above structure, the first value $\Delta n_a$ is 0% or more and 1.0% or less. Since the first value $\Delta n_a$ is set to 0% or more in this manner, a dopant for decreasing the refractive index is not added to the first core portion, and the nonlinear refractive index of the first core portion where the signal light is mostly concentrated is not increased by the dopant added for decreasing the refractive index. No extra index reducer for decreasing the refractive index is added to the second core portion or the cladding portion for the purpose of maintaining the entire shape of the refractive index profile. Thus, an increase in nonlinear refractive index of the optical fiber as a whole can be prevented.

When germanium used for increasing the refractive index is compared with fluorine used for decreasing the refractive index, an increase in nonlinear refractive index in use of germanium is about 1/3 that in use of fluorine at the condition that the refractive index is changed with respect to pure silica glass while the absolute value of the changes is kept unchanged. Accordingly, when using germanium for increasing the refractive index and fluorine for decreasing the refractive index, it is preferable to add germanium rather than fluorine to a portion where light is concentrated, because the nonlinear refractive index is not increased.

When the first core portion is substantially made of pure silica glass, this is not always an optimum arrangement for suppressing the adverse influence of the nonlinear optical effect. More specifically, when propagating signal light is particularly concentrated on the first core portion, it is optimum that the first core portion is substantially formed with pure silica glass. However, when a relatively large amount of light propagates in the cladding region as well, a dopant for increasing the refractive index is added to the first core portion and the concentration of the dopant for decreasing the refractive index of the second core portion is decreased, thereby more effectively suppressing the adverse influence of nonlinear optical effect in the optical fiber as a whole.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DESCRIPTION OF THE PREFERRED EMBODIMENT

Figure 1:
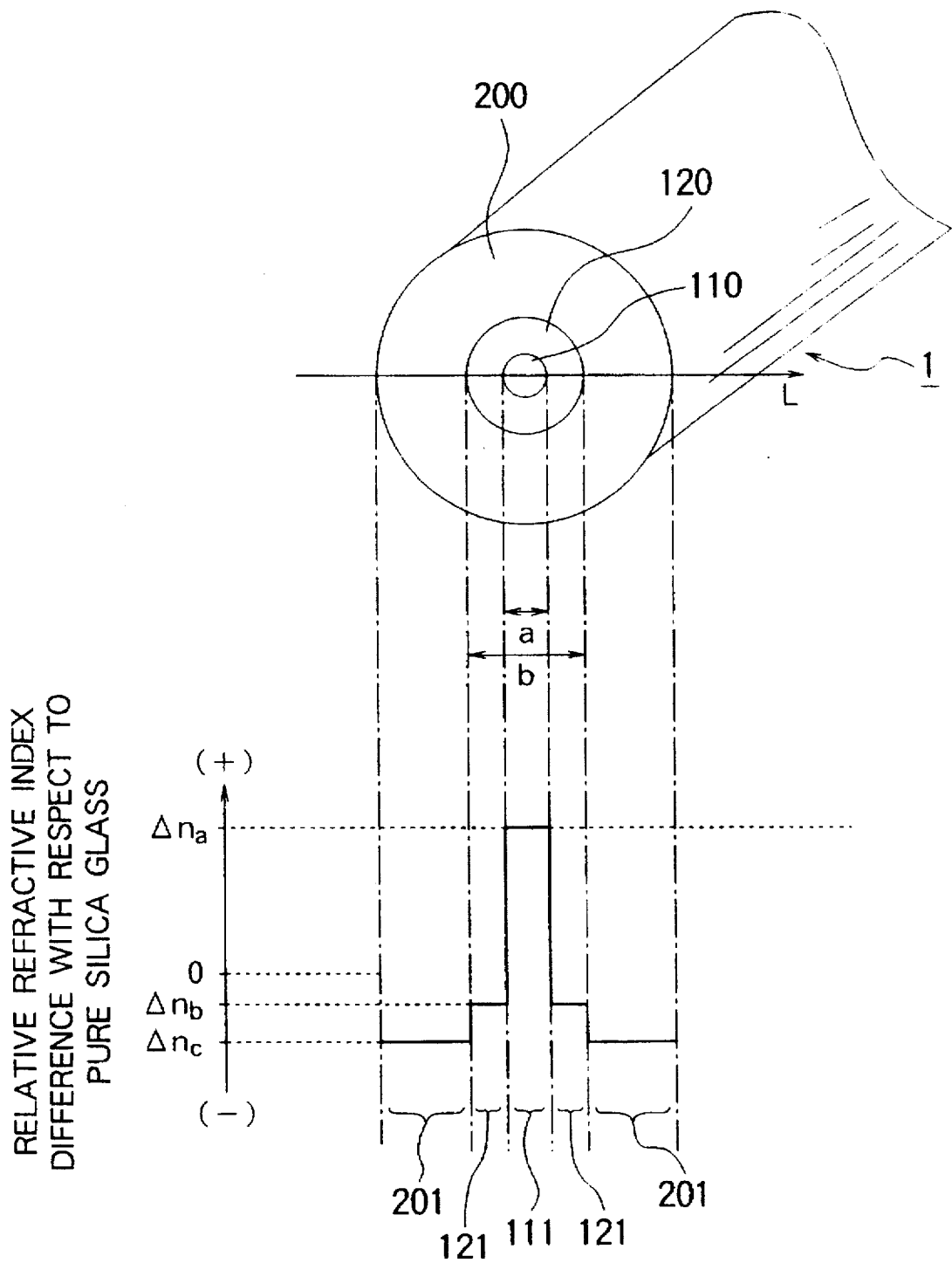
FIG. 1 shows a sectional view of a single-mode optical fiber according to an embodiment of the present invention, and a graph of the refractive index profile of this optical fiber.

An SM optical fiber according to the present invention will be described with reference to FIGS. 1 to 10. In description of the drawings, the same elements are denoted by the same reference numerals, and a repetitive description thereof will be omitted.

FIG. 1 shows the sectional structure of an SM optical fiber (dispersion-shifted fiber) according to the present invention and its refractive index profile. As shown in FIG. 1, this dispersion-shifted fiber is a single-mode optical fiber containing silica glass as the major component, and has an inner core portion 110 (first core portion), an outer core portion 120 (second core portion), and a cladding portion 200. The average relative refractive index difference of the inner core portion 110 with respect to pure silica glass is $\Delta n_a$, and the outer diameter of the inner core portion 110 is a. The outer core portion 120 is a silica glass region formed in close contact on the outer surface of the inner core portion 110. The average relative refractive index difference of the outer core portion 120 with respect to pure silica glass is $\Delta n_b$ ($\leq \Delta n_a$), and the outer diameter of the outer core portion 120 is b (b>a). The cladding portion 200 is a silica glass region formed in tight contact on the outer surface of the outer core portion 120. The average relative refractive index difference of the cladding portion 200 with respect to pure silica glass is $\Delta n_c$ ($\Delta n_c \leq \Delta n_b$ and $\Delta n_c$<0).

The axis of abscissa of the refractive index profile shown in FIG. 1 corresponds to respective positions on a line L of a section (a surface perpendicular to the traveling direction of propagating signal light) of this optical fiber. In this refractive index profile, a region 111, a region 121, and a region 201 correspond to the relative refractive index differences of the respective portions on the line L of the first core portion 110, the second core portion 120, and the cladding portion 200, respectively. The refractive index profile shown in FIG. 1 is that of a dual shape type dispersion-shifted fiber in which a/b=0.20, MFD=8.4 μm, and zero-dispersion wavelength=1,570 nm.

The first, second, and third values $\Delta n_a$, $\Delta n_b$, and $\Delta n_c$ are respectively given by:

$$\Delta n_a = (<N_a> - <N_p>)/<N_p>$$

$$\Delta n_b = (<N_b> - <N_p>)/<N_p>$$

$$\Delta n_c = (<N_c> - <N_p>)/<N_p>$$

where $<N_a>$: average refractive index of first core portion $<N_b>$: average refractive index of second core portion $<N_c>$: average refractive index of cladding portion $<N_p>$: refractive index of pure silica glass The order of the refractive indices of the respective equations does not matter. Therefore, in this specification, a glass region in which the average relative refractive index difference with respect to pure silica glass takes a negative value means a glass region having a lower average refractive index than the refractive index of this pure silica glass. Also, an average refractive index is a surface average obtained by averaging the refractive indices at the respective portions in a predetermined glass region of a section of this dispersion-shifted fiber which is perpendicular to the traveling direction of the signal light.

The relationship between the dose of germanium in silica glass and the refractive index can be obtained from "Dispersion in $GeO_2$-$SiO_2$ glasses" by James W. Fleming (APPLIED OPTICS, Vol. 24, No. 24, 15 December, 1984, pp. 4,486–4,493), and the relationship between the concentration of fluorine in silica glass and the refractive index can be obtained from "Refractive index dispersion and related properties in fluorine doped silica" by James W. Fleming et al. (APPLIED OPTICS, Vol. 23, No. 19, 1 Oct., 1983, pp. 3,102–3,104).

Based on these known relationships, the desired concentrations of germanium and fluorine for a refractive index profile that satisfy a/b=0.20, MFD=8.4 μm, and zero-dispersion wavelength=1,570 nm were calculated.

The SM optical fiber of this embodiment was fabricated by heating and drawing an optical fiber perform manufactured in accordance with the known OVD or MCVD method.

In the SM optical fiber of this embodiment, the second-order nonlinear refractive index $<N_2>$ serving as the major factor of causing waveform distortion in a signal light pulse is as follows. The relationship between the concentrations of germanium and fluorine in pure silica glass and the nonlinear refractive index was obtained from above-mentioned "Estimation of nonlinear refractive index in various silica-based glasses for optical fibers" by T. Kato et al. (OPTICS LETTERS, Vol. 20, No. 22, pp. 2,279–2,281, Nov. 15, 1995).

Figure 2:
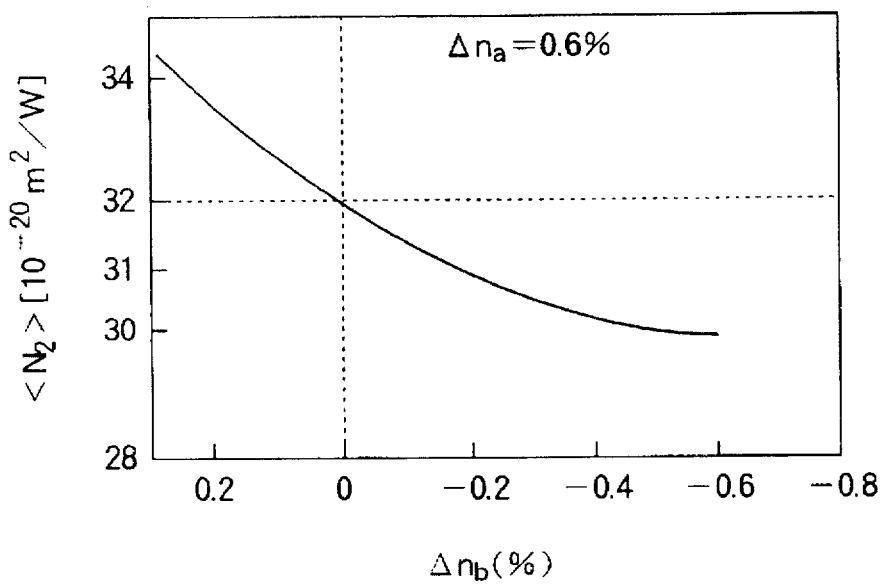
FIG. 2 is a graph showing the relationship between the second-order nonlinear refractive index $<N_2>$ and the relative refractive index difference $\Delta n_b$ of an outer core portion with respect to pure silica glass ($\Delta n_a = 0.6\%$)
Figure 3:
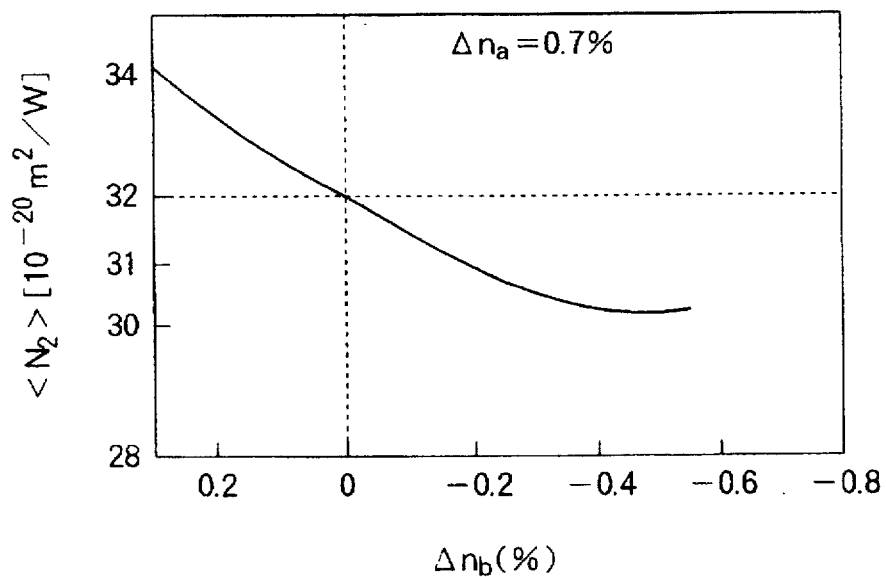
FIG. 3 is a graph showing the relationship between the second-order nonlinear refractive index $<N_2>$ and the relative refractive index difference $\Delta n_b$ of an outer core portion with respect to pure silica glass ($\Delta n_a$=0.7%)
Figure 4:
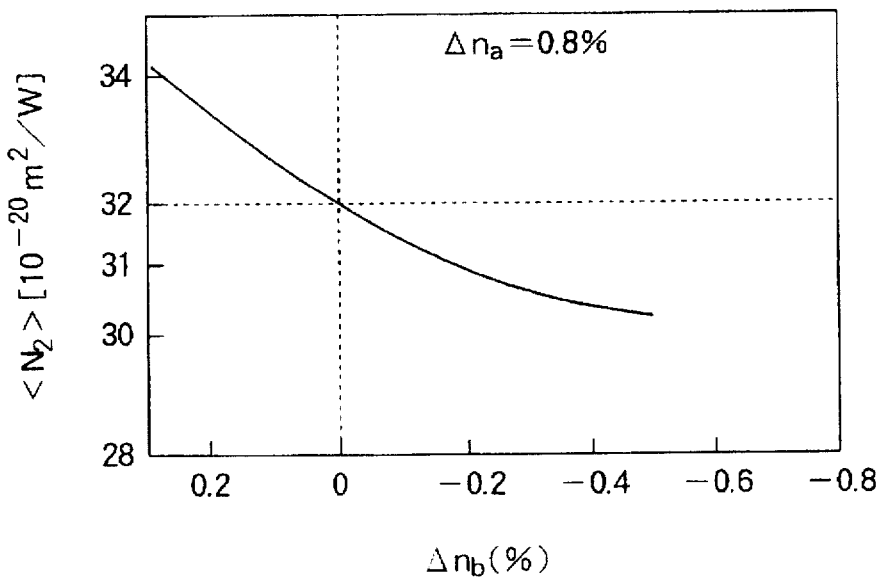
FIG. 4 is a graph showing the relationship between the second-order nonlinear refractive index $<N_2>$ and the relative refractive index difference $\Delta n_b$ of an outer core portion with respect to pure silica glass ($\Delta n_a$=0.8%)
Figure 5:
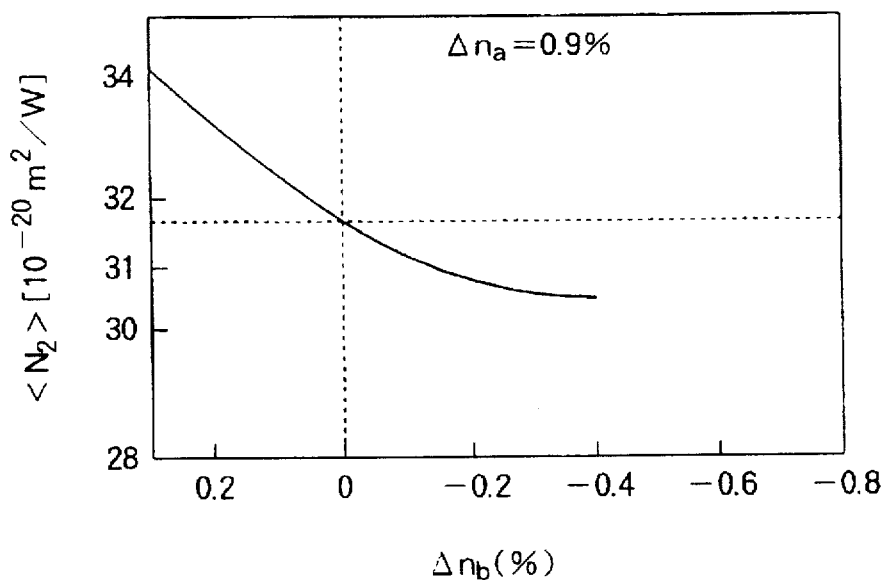
FIG. 5 is a graph showing the relationship between the second-order nonlinear refractive index $<N_2>$ and the relative refractive index difference $\Delta n_b$ of an outer core portion with respect to pure silica glass ($\Delta n_a$=0.9%)
Figure 6:
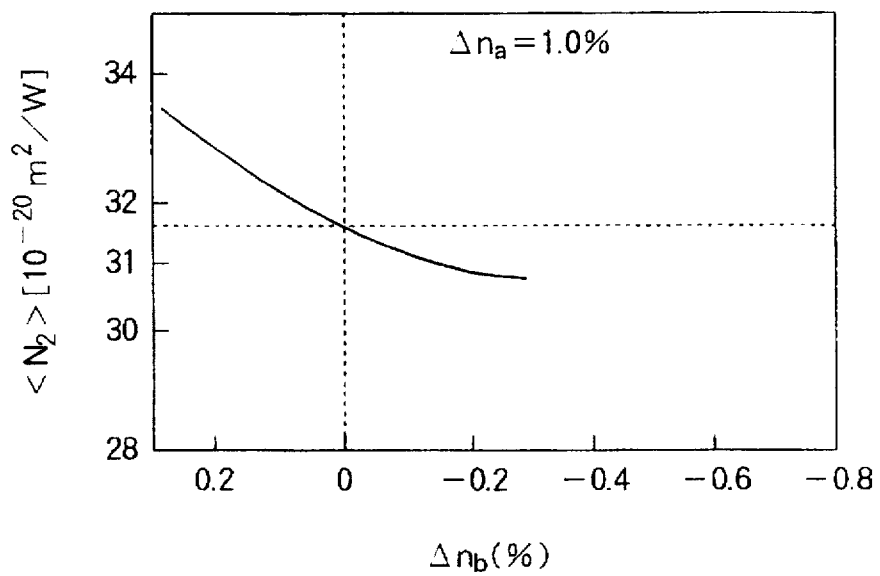
FIG. 6 is a graph showing the relationship between the second-order nonlinear refractive index $<N_2>$ and the relative refractive index difference $\Delta n_b$ of an outer core portion with respect to pure silica glass ($\Delta n_a$=1.0%)
Figure 7:
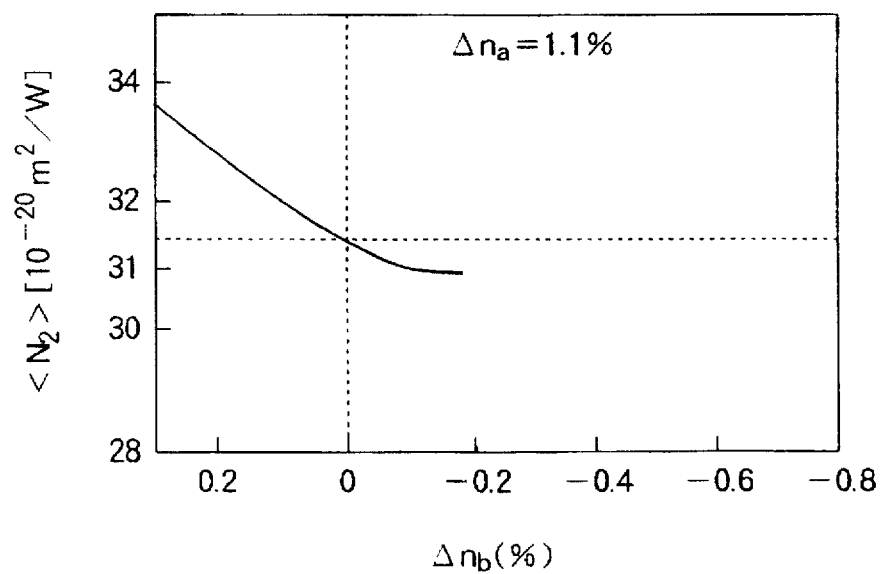
FIG. 7 is a graph showing the relationship between the second-order nonlinear refractive index $<N_2>$ and the relative refractive index difference $\Delta n_b$ of an outer core portion with respect to pure silica glass ($\Delta n_a$=1.1%)
Figure 8:
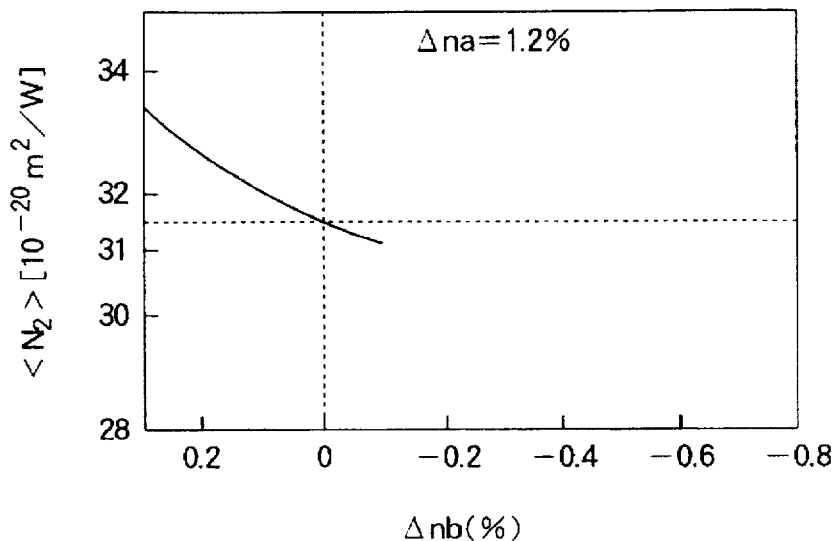
FIG. 8 is a graph showing the relationship between the second-order nonlinear refractive index $<N_2>$ and the relative refractive index difference $\Delta n_b$ of an outer core portion with respect to pure silica glass ($\Delta n_a$=1.2%)

FIGS. 2 to 8 are graphs showing the relationship between the second-order nonlinear refractive index $<N_2>$ for different values of $\Delta n_a$ and the relative refractive index difference $\Delta n_b$ of outer core portions with respect to pure silica glass by changing the relative refractive index difference $\Delta n_a$ with respect to pure silica glass. The relative refractive index difference $\Delta n_c$ of the cladding portion with respect to pure silica glass, the outer diameter a of the inner core portion 110, and the outer diameter b of the outer core portion 120 are selected to satisfy a/b=0.20, MFD=8.4 µm, and zero-dispersion wavelength=1,570 nm. FIG. 2 shows the relationship between $<N_2>$ and $\Delta n_b$ when $\Delta n_a$=0.6%, FIG. 3 shows the relationship between $<N_2>$ and $\Delta n_b$ when $\Delta n_a$= 0.7%, FIG. 4 shows the relationship between $<N_2>$ and $\Delta n_b$ when $\Delta n_a$=0.8%, FIG. 5 shows the relationship between $<N_2>$ and $\Delta n_b$ when $\Delta n_a$=0.9%, FIG. 6 shows the relationship between $<N_2>$ and $\Delta_b$ when $\Delta n_a$=1.0%, FIG. 7 shows the relationship between $<N_2>$ and $\Delta n_b$ when $\Delta n_a$=1.1%, and FIG. 8 shows the relationship between $<N_2>$ and $\Delta n_b$ when $\Delta n_a$=1.2%, respectively.

From FIGS. 2 to 8, it is confirmed that for any $\Delta n_a$, the smaller $\Delta n_b$, the lower the nonlinear refractive index $<N_2>$, which is advantageous. Accordingly, in the SM optical fiber of this embodiment, the second-order nonlinear refractive index $<N_2>$ can be lower than that in the conventional dispersion-shifted fiber in which $\Delta n_c$=0 and inevitably $\Delta n_b$>0.

From FIGS. 2 to 8, when $\Delta n_b$ >0, $<N_2> \leq 3.1 \times 10^{-20}$ m$^2$/W is obtained, and as $\Delta_b$ is increased, the second-order nonlinear refractive index $<N_2>$ is increased. Thus, it is preferable that $\Delta n_b \leq 0$. Hence, the SM optical fiber according to the present invention is characterized in that $\Delta n_b \leq 0$.

In FIGS. 2 to 8, the fact that no lines exist in a small $\Delta n_b$ region (negative region) of the graph indicates that a solution satisfying the zero-dispersion wavelength (1,570 nm) does not exist. This means that even if $\Delta n_b$ is decreased for $\Delta n_a$ >1.0%, the second-order nonlinear refractive index $<N_2>$ cannot be sufficiently decreased (refer FIGS. 2 to 8). Therefore, the SM optical fiber according to the present invention is characterized in that $\Delta n_a \leq 1.0\%$.

In SM optical fibers according to the respective aspects of the present invention, fluorine is not added to the inner core portion 110. Accordingly, $\Delta N_a \geq 0\%$ is obtained, and the nonlinear refractive index of the inner core portion 110 where propagating signal light is mostly concentrated is not increased by fluorine. Furthermore, since extra fluorine is not added to the outer core portion 120 and the cladding portion 200 to maintain the entire shape of the refractive index profile, an increase in nonlinear refractive index of the optical fiber as a whole is suppressed.

Figure 9:
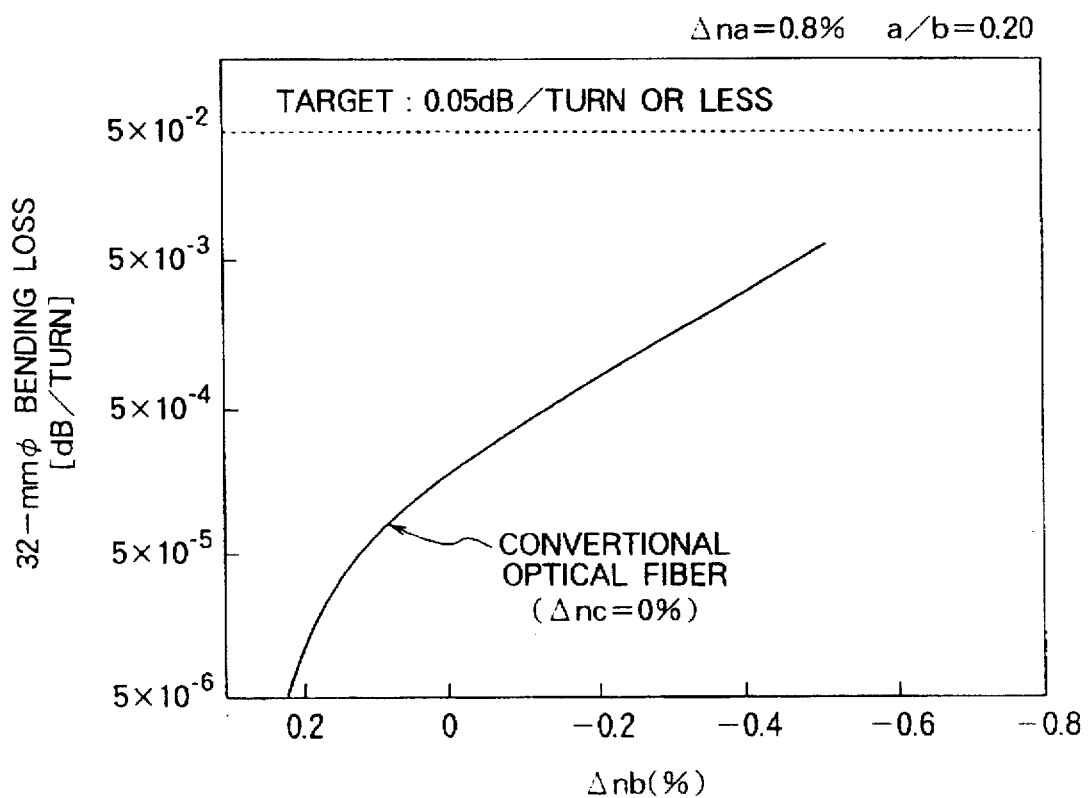
FIG. 9 is a graph showing the relationship between the relative refractive index difference $\Delta n_b$ of an outer core portion with respect to pure silica glass and a 32-mm$\phi$ bending loss of a single-mode optical fiber manufactured under predetermined conditions.

FIG. 9 is a graph showing the relationship between $\Delta n_b$ and a 32-mmφ bending loss of an SM optical fiber manufactured to satisfy $\Delta n_a$=0.8%, a/b=0.2, MFD=8.4 µm, and zero-dispersion wavelength=1,570 nm. A 32-mmφ bending loss is a transmission loss of 1,550-nm wavelength light in an optical fiber as a measurement target which is wound on a mandrel having a diameter of 32 mm by one turn (refer to Bellcore standard 4.2.6).

As is apparent from FIG. 9, in the optical fiber having the above arrangement, under the condition of $\Delta n_b = -0.5\%$ for the lowest nonlinear refractive index, the 32-nm diameter bending loss is increased 100 times or more that obtained with a conventional dispersion-shifted fiber in which $\Delta n_c$=0. Nevertheless, 32-mmφ bending loss=0.05 dB/turn, which is a practical condition of an optical fiber, is also satisfied sufficiently. The 0.05 dB/turn of the 32-mmφ bending loss substantially equals to 0.5 dB/m of the 32-mmφ bending loss, and further substantially equals to 1 dB/m of a 30-mmφ bending loss.

Figure 10:
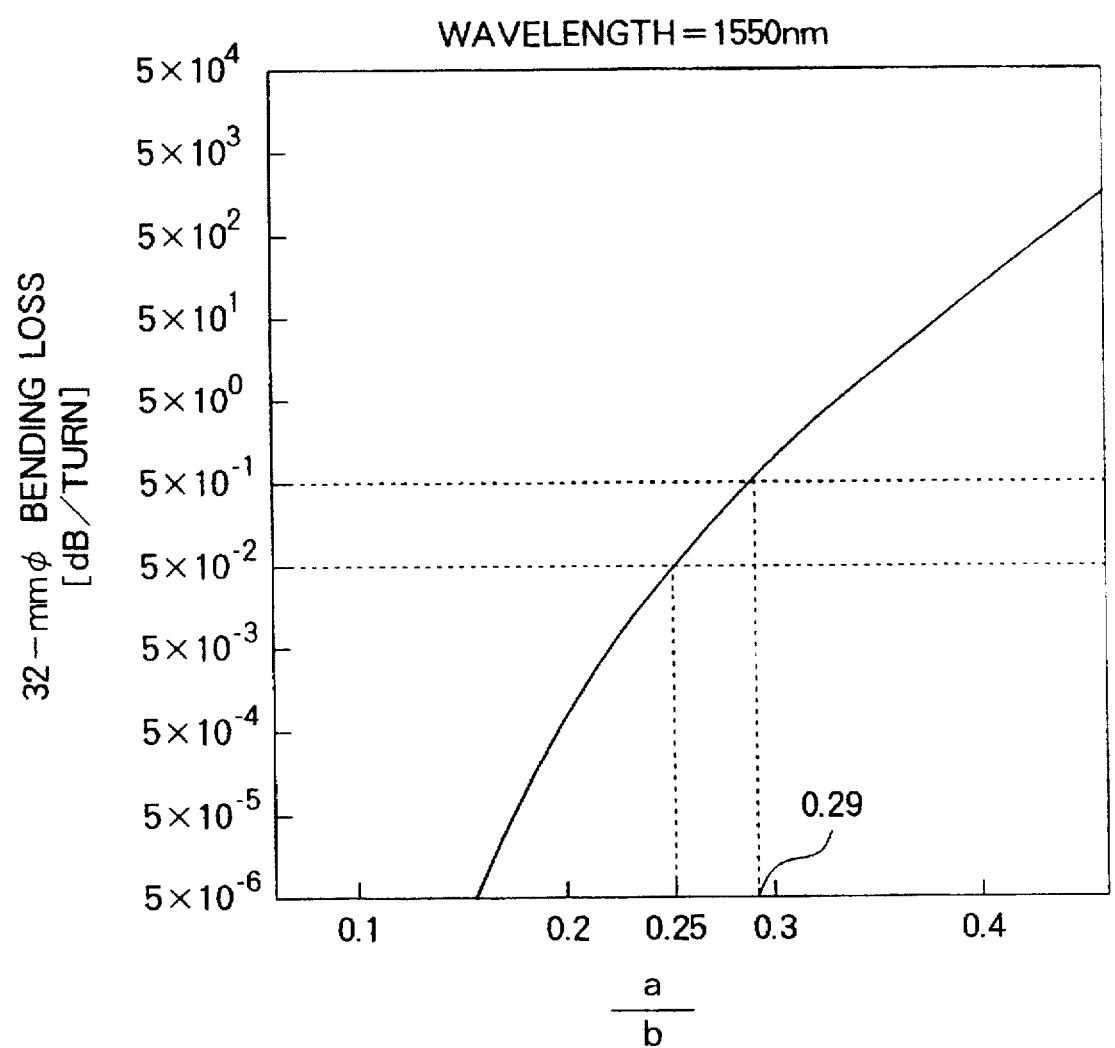
FIG. 10 is a graph showing the relationship between (outer diameter a of inner-layer core)/(outer diameter b of outer-layer core) and the 32-mm$\phi$ bending loss of a single-mode optical fiber manufactured under predetermined conditions.

FIG. 10 is a graph showing the relationship between a/b and the 32-mmφ bending loss of an SM optical fiber manufactured to satisfy $\Delta n_a$=0.8%, $\Delta n_b$= −0.4%, MFD =8.4 µm, and zero-dispersion wavelength=1,570 nm. The 32-mmφ bending loss is measured for light having a wavelength of 1,550 nm, as described above.

It is known from FIG. 10 that 32-mmφ bending loss $\leq 0.50$ dB/turn, which is the practical condition of an optical fiber, is satisfied sufficiently. It is also known that in order to satisfy a stricter standard (32-mmφ bending loss=0.50 dB/turn or less), a/b $\leq 0.25$ is preferable. In either case, a/b is 1.0 or more in order to satisfy the conditions for a single-mode optical fiber.

As described above, according to the SM optical fiber of the present invention, the nonlinear refractive index for signal light having a predetermined wavelength is decreased, and the bending loss can be set within an allowable range, so that signal light transmission can be performed appropriately while decreasing a waveform distortion of signal light pulse.

The arrangement of the SM optical fiber according to the present invention is not limited to the above embodiment, but various changes and modifications can be made. For example, in the above embodiment, the refractive index profile is of a step type. However, the inner core portion 110 may have a convex refractive index profile. Also, the outer core portion 120 may have a refractive index profile which is inclined in the radial direction at a predetermined portion of the optical fiber. These cases can be dealt with in the same manner as in the above embodiment by using the effective refractive index differences of the respective portions.

As has been described in detail, according to the present invention, in a single-mode optical fiber which contains silica glass as the major component and in which the zero-dispersion wavelength is set to 1,560 nm or more and 1,580 nm or less and the mode field diameter with respect to light having a predetermined wavelength is set to 8 µm, the relative refractive index difference of the cladding portion with respect to pure silica glass is set to a negative value, and the outer diameter a of the first core portion and the outer diameter b of the second portion are set to satisfy $$0.10 \leq a/b \leq 0.29$$

and preferably $$0.10 \leq a/b \leq 0.25$$

Thus, when compared to the conventional dispersion-shifted fiber, the nonlinear refractive index with respect to signal light can be decreased by 5% to 10%, and the bending loss can be set within the allowable range. As a result, with the SM optical fiber according to the present invention, appropriate signal light transmission can be realized while decreasing a waveform distortion of signal light pulse.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

The basic Japanese Application No. 309033/1995 filed on Nov. 28, 1995 and No. 303103/1996 filed on Nov. 14, 1996 are hereby incorporated by reference.

What is claimed is:

1. A dispersion-shifted fiber containing silica glass as a major component, comprising:

a first core portion having a predetermined average refractive index;

a second core portion which is a glass region formed on an outer surface of said first core portion and having an average refractive index lower than that of said first core portion; and a cladding portion which is a glass region formed on an outer surface of said second core portion and having an average refractive index lower than that of pure silica glass and that of said second core portion, wherein said first and second core portions satisfy the following relationship:

$$0.10 \leq a/b \leq 0.29$$

where a is an outer diameter of said first core portion and b is an outer diameter of said second core portion.

2. A fiber according to claim 1, wherein said dispersion-shifted fiber is a single-mode optical fiber in which a zero-dispersion wavelength is set to fall within a range of 1,560 nm to 1,580 nm, and a mode field diameter with respect to light having a predetermined wavelength is set to not less than 8 μm.

3. A fiber according to claim 1, wherein the outer diameter of said first core portion is 1 to 6 μm.

4. A fiber according to claim 1, wherein said first and second core portions satisfy a relationship:

$$0.10 \leq a/b \leq 0.25$$

where a is an outer diameter of said first core portion and b is an outer diameter of said second core portion.

5. A fiber according to claim 4, wherein the outer diameter of said first core portion is 1 to 5 μm, and a bending transmission loss of said dispersion-shifted fiber at a diameter of 32 mm is not more than 0.05 dB/turn.

6. A fiber according to claim 1, wherein an average relative refractive index difference of said second core portion with respect to pure silica glass is not more than 0%.

7. A fiber according to claim 1, wherein an average relative refractive index difference of said first core portion with respect to pure silica glass is 0% to 1.0%.

8. A fiber according to claim 1, wherein said first core portion is substantially made of a material selected from the group consisting of pure silica glass and silica glass doped with only germanium as a dopant;

said second core portion is substantially made of a material selected from the group consisting of pure silica glass, silica glass doped with at least fluorine as a dopant, and silica glass doped with at least germanium as a dopant; and said cladding portion is substantially made of silica glass substantially doped with only fluorine as a dopant.

9. A single-mode optical fiber which contains silica glass as a major component and in which a zero-dispersion wavelength is set to fall within a range of 1,560 nm to 1,580 nm and a mode field diameter with respect to light having a predetermined wavelength is set to not less than 8 μm, said single-mode optical fiber comprising:

a first core portion in which an average relative refractive index difference with respect to pure silica glass is set to a first value;

a second core portion which is formed on an outer surface of said first core portion and in which an average relative refractive index difference with respect to pure silica glass is set to a second value smaller than the first value; and a cladding portion which is formed on an outer surface of said second core portion and in which an average refractive index difference with respect to pure silica glass is a negative value set to a third value smaller than the second value, wherein said first and second core portions satisfy the following relationship:

$$0.10 \leq a/b \leq 0.29$$

where a is an outer diameter of said first core portion and b is an outer diameter of said second core portion.

10. A fiber according to claim 9, wherein the outer diameter of said first core portion is 1 to 6 μm.

11. A fiber according to claim 9, wherein said first and second core portions satisfy a relationship:

$$0.10 \leq a/b \leq 0.25$$

where a is an outer diameter of said first core portion and b is an outer diameter of said second core portion.

12. A fiber according to claim 11, wherein the outer diameter of said first core portion is 1 to 5 μm, and a bending transmission loss of said single-mode optical fiber at a diameter of 32 mm is not more than 0.05 dB/turn.

13. A fiber according to claim 9, wherein the second value is not more than 0%.

14. A fiber according to claim 9, wherein the first value is 0% to 1.0%.

15. A fiber according to claim 9, wherein said first core portion is substantially made of a material selected from the group consisting of pure silica glass and silica glass doped with only germanium as a dopant;

said second core portion is substantially made of a material selected from the group consisting of pure silica glass, silica glass doped with at least fluorine as a dopant, and silica glass doped with at least germanium as a dopant; and said cladding portion is substantially made of silica glass substantially doped with only fluorine as a dopant.

* * * * *